United States Patent
Oguri

(10) Patent No.: US 8,102,150 B2
(45) Date of Patent: Jan. 24, 2012

(54) ELECTRONIC APPARATUS, CHARGER, CHARGING SYSTEM, AND CHARGING METHOD

(75) Inventor: Shinji Oguri, Saitama (JP)

(73) Assignee: NEC Corporation, Tokyo (JP)

( * ) Notice: Subject to any disclaimer, the term of this patent is extended or adjusted under 35 U.S.C. 154(b) by 418 days.

(21) Appl. No.: 12/518,147

(22) PCT Filed: Dec. 5, 2007

(86) PCT No.: PCT/JP2007/073462
§ 371 (c)(1),
(2), (4) Date: Jun. 8, 2009

(87) PCT Pub. No.: WO2008/072512
PCT Pub. Date: Jun. 19, 2008

(65) Prior Publication Data
US 2010/0026099 A1    Feb. 4, 2010

(30) Foreign Application Priority Data
Dec. 8, 2006    (JP) .................................. 2006-332081

(51) Int. Cl.
*H01M 10/44* (2006.01)
*H01M 10/46* (2006.01)
(52) U.S. Cl. ....................................................... 320/128
(58) Field of Classification Search .................. 320/107, 320/114, 115, 128, 138, 152, 162
See application file for complete search history.

(56) References Cited

U.S. PATENT DOCUMENTS

| 5,762,512 A | * | 6/1998 | Trant et al. | 320/114 |
|---|---|---|---|---|
| 2006/0082344 A1 | * | 4/2006 | Lai et al. | 320/128 |
| 2008/0157718 A1 | * | 7/2008 | Ohnuki | 320/134 |

FOREIGN PATENT DOCUMENTS

| JP | 1998023113 A | 1/1998 |
|---|---|---|
| JP | 3128221 B | 11/2000 |

OTHER PUBLICATIONS

International Search Report for PCT/JP2007/073462 mailed Mar. 18, 2008.

* cited by examiner

*Primary Examiner* — Edward Tso

(57) ABSTRACT

An electronic apparatus 100 has a main circuit 4 operable by a power supply from a battery 1, and a switch 21 for changing ON/OFF of the power supply from the battery 1 to the main circuit 4. A switch control signal is produced to switch ON/OFF of the switch 21 responsive to whether or not the electronic apparatus 100 is connected to the charger 200. If the electronic apparatus 100 is removed from the charger 200, the switch 21 becomes ON. The power is supplied from the battery 1 to the main circuit 4. The electronic apparatus 100 is connected to the charger 200, the charge of the battery 1 and the power supply from the charger 200 to the main circuit 4 is started. The switch 21 is OFF by the switch control signal. The power supply from the battery 1 to the main circuit 4 is stopped.

24 Claims, 7 Drawing Sheets

ELECTRONIC APPARATUS, CHARGER, CHARGING SYSTEM, AND CHARGING METHOD

This application is the National Phase of PCT/JP2007/073462, filed Dec. 5, 2007, which is based upon and claims priority from Japanese Patent Application No. 2006-332081 filed Dec. 8, 2006, which is incorporated herein in its entirety.

TECHNICAL FIELD

The present invention relates to an electronic apparatus which needs an electric charge, a charger, a charging system, and a charging method thereof.

BACKGROUND TECHNIQUE

Conventionally, while a battery of an electronic apparatus, such as a portable telephone, or the like is being charged, various circuits operable by being supplied with electric power from the battery (Hereunder, called main circuits) are charged by the battery.

This causes a problem that a capacity of the battery is reduced in spite of charging the battery, or that a time for charging the battery becomes long.

A technique disclosed, for example, in Patent Reference 1 is involved in conventional techniques made in view of the problems thus mentioned.

Patent Reference 1 discloses a calling apparatus in which a battery is supplied with a charging power from a charger, the calling apparatus comprising: an electric power supplying terminal for directly supplying a main circuit with an electric power from the charger through no battery; a first switch which conducts ON/OFF of supplying the main circuit with the electric power stored in the battery; a second switch which conducts ON/OFF of supplying the main circuit with the electric power through the electric power supplying terminal.

The first and the second switches in the calling apparatus disclosed in Patent Reference 1 are small-sized switches disposed in an operation panel of the calling apparatus, semiconductor switches of which ON/OFF are controlled by the small-sized switches, and the like. Namely, changes of ON/OFF of the first and the second switches are implemented respectively by user's operations.

Patent Reference 1: Official Gazette of unexamined Japanese patent publication H 10-023113

DISCLOSURE OF THE INVENTION

Problem to be Solved by the Invention

However, in the above-described technique disclosed in Patent Reference 1, it is necessary for the user to conduct ON/OFF of electric power supply from the battery to the main circuit (namely, ON/OFF of the first switch) and ON/OFF of electric power supply from the charger to the main circuit (namely, ON/OFF of the second switch), respectively by operating the operation panel.

Consequently, problems are caused to occur, for example, if the user forgets to operate the operation panel. Namely, as a problem, a battery capacity is reduced, although the battery is being charged. As another problem, a charging time inevitably becomes long. Further, if the user forgets to operate the operation panel, yet another problem is also caused to occur. Namely, the calling apparatus cannot be operable after the calling apparatus has been removed from the charger, since the main circuit of the calling apparatus is not supplied with the electric power from the battery.

Furthermore, in the technique disclosed in Patent Reference 1, still another problem is caused to occur. Namely, in a case that the user conducts an operation for switching a source of power supply to the main circuit from the battery into the charger and then the user makes the first switch be OFF before making the second switch be ON, the power supply to the main circuit is temporarily broken. As a result, a processing that is being carried out is sometimes interrupted.

Accordingly, for example, if the power supply is broken during a processing of communication by the main circuit, a problem that the communication is broken is caused to occur. Concretely, for example, the communication is broken. Or else, the power supply to the main circuit is sometimes broken during a reception of data (an electronic mail, a download data, or the like). This causes a problem that the reception of data is delayed and another problem that the processing again needs to be carried out from the beginning thereof.

The present invention has been made to solve the problems thus described. It is therefore an object of the present invention to provide an electronic apparatus, a charger, a charging system, and a charging method which is capable of preventing the battery capacity from being reduced during charge of the battery and of preventing a charging time from becoming long, and which is also capable of automatically switching a source of power supply to a main circuit at the time of charging thereof.

Further, it is preferably an object of the present invention to provide an electronic apparatus, a charger, a charging system, and a charging method which is capable of preventing the power supply from being temporarily broken at the time of switching a source of power supply to a main circuit.

Means for Solving the Problem

In order to solve the above problems, in a charging system according to the present invention having an electronic apparatus which has a battery capable of being charged, and a charger which charges said battery in a condition that said electronic apparatus is connected to the charger, said electronic apparatus comprising:

a main circuit which is capable of being operable by being supplied with an electric power from said battery;

a battery-main circuit power supply switch for conducting ON/OFF of an electric power supply from said battery to said main circuit;

said charging system further comprising:

a switch control signal producing section for producing a switch control signal which switches ON/OFF of said battery-main circuit power supply switch, dependent on whether or not said electronic apparatus is connected to said charger; wherein;

in a condition that said electronic apparatus is removed from said charger, said battery-main circuit power supply switch is switched into ON by said switch control signal, so that an electric power is supplied from said battery to said main circuit;

in a condition that said electronic apparatus is connected to said charger, not only said battery is started to be charged by said charger but also said main circuit is started to be supplied with said electric power from said charger, on the other hand, said battery-main circuit power supply switch is switched into OFF by said switch control signal, so that an electric power is stopped to be supplied from said battery to said main circuit.

Further, in a charging system according to the present invention having an electronic apparatus which has a battery capable of being charged, and a charger which charges said battery in a condition that said electronic apparatus is connected to the charger, said electronic apparatus comprising:

a main circuit which is capable of being operable by being supplied with an electric power from said battery;

a battery-main circuit power supply switch for conducting ON/OFF of an electric power supply from said battery to said main circuit;

a charging circuit which divides an electric power supplied from said charger into an electric power supplied to said battery and an electric power supplied to said main circuit, so that the electric power is supplied to said battery and said main circuit, respectively;

said charging system further comprising:

a switch control signal producing section for producing a switch control signal which switches ON/OFF of said battery-main circuit power supply switch, dependent on whether or not said electronic apparatus is connected to said charger; wherein;

in a condition that said electronic apparatus is removed from said charger, said battery-main circuit power supply switch is switched into ON by said switch control signal, so that an electric power is supplied from said battery to said main circuit;

in a condition that said electronic apparatus is connected to said charger, not only said battery is started to be charged by said charger through said charging circuit but also said main circuit is started to be supplied with said electric power from said charger through said charging circuit, on the other hand, said battery-main circuit power supply switch is switched into OFF by said switch control signal, so that an electric power is stopped to be supplied from said battery to said main circuit.

In the charging system according to the present invention, preferably, said charger further comprising:

a lock mechanism for keeping said charger and said electronic apparatus in a connected condition with each other;

an operation section by which an user conducts an operation for releasing said connected condition of said charger and said electronic apparatus;

a power supply circuit for producing en electric power supplied to said electronic apparatus; wherein when said user conducts said operation by said operation section in said connected condition of said charger and said electronic apparatus, said battery-main circuit power supply switch is switched into ON, so that an electric power is started to be supplied from said battery to said main circuit; and releasing of said connected condition of said charger and said electronic apparatus by said lock mechanism can be conducted only by a condition that said operation section is being operated.

In the charging system according to the present invention, preferably, said switch control signal producing section further comprising:

an original control signal outputting section for outputting an original control signal which is a source of said switch control signal in a condition that said operation section of said charger is being operated;

an NOT circuit which receives said original control signal inputted from said original control signal outputting section to produce an NOT output; and an AND circuit which receives said NOT output from said NOT circuit and an output from said power supply circuit to produce an AND output as said switch control signal.

In the charging system according to the present invention, preferably, said original control signal outputting section further comprising:

an NOT circuit input changing switch which changes conditions whether or not said output from said power supply circuit is inputted into said NOT circuit in a condition that said electronic apparatus is connected to said charger; wherein said NOT circuit input changing switch is switched into ON in said condition that said operation section is being operated, so that said output from said power supply circuit is inputted into said NOT circuit.

In the charging system according to the present invention, preferably, an input inputted into said NOT circuit of said switch control signal producing section is connected to a ground potential through resistance.

In the charging system according to the present invention, preferably, until a predetermined delay time has passed after said electronic apparatus was connected to said charger, a power supply from said battery to said main circuit is maintained in a condition that said battery-main circuit power supply switch is ON, when said predetermined delay time has passed after said electronic apparatus was connected to said charger, said power supply from said battery to said main circuit is stopped in a condition that said battery-main circuit power supply switch is OFF.

In the charging system according to the present invention, preferably, a delay circuit is provided in a transfer route of said switch control signal, and thereby said battery-main circuit power supply switch is maintained in a condition of ON until said delay time has passed after said electronic apparatus was connected to said charger.

In the charging system according to the present invention, preferably, said charging system further comprising:

switch control means which make said battery-main circuit power supply switch be ON in a case that an amount of power supply to said main circuit is not enough during a charge of said battery.

In an electronic apparatus according to the present invention which has a battery capable of being charged and in which said battery can be charged by said charger being connected to said electronic apparatus, said electronic apparatus comprising:

a main circuit which is capable of being operable by being supplied with an electric power from said battery;

a battery-main circuit power supply switch for conducting ON/OFF of an electric power supply from said battery to said main circuit; wherein in a condition that said electronic apparatus is removed from said charger, said battery-main circuit power supply switch is switched into ON, so that an electric power is supplied from said battery to said main circuit;

in a condition that said electronic apparatus is connected to said charger, not only said battery is started to be charged by said charger but also said main circuit is started to be supplied with said electric power from said charger, on the other hand, said battery-main circuit power supply switch is switched into OFF, so that an electric power is stopped to be supplied from said battery to said main circuit.

In an electronic apparatus according to the present invention which has a battery capable of being charged and in which said battery can be charged by said charger being connected to said electronic apparatus, said electronic apparatus comprising:

a main circuit which is capable of being operable by being supplied with an electric power from said battery;

a battery-main circuit power supply switch for conducting ON/OFF of an electric power supply from said battery to said main circuit;

a charging circuit which divides an electric power supplied from said charger into an electric power supplied to said battery and an electric power supplied to said main circuit, so that the electric power is supplied to said battery and said main circuit, respectively; wherein in a condition that said electronic apparatus is removed from said charger, said battery-main circuit power supply switch is switched into ON, so that an electric power is supplied from said battery to said main circuit;

in a condition that said electronic apparatus is connected to said charger, not only said battery is started to be charged by said charger through said charging circuit but also said main circuit is started to be supplied with said electric power from said charger through said charging circuit, on the other hand, said battery-main circuit power supply switch is switched into OFF, so that an electric power is stopped to be supplied from said battery to said main circuit.

In the electronic apparatus according to the present invention, preferably, said charger further comprising:

a lock mechanism for keeping said charger and said electronic apparatus in a connected condition with each other;

an operation section by which an user conducts an operation for releasing said connected condition of said charger and said electronic apparatus;

a power supply circuit for producing en electric power supplied to said electronic apparatus; wherein when said user conducts said operation by said operation section in said connected condition of said charger and said electronic apparatus, said battery-main circuit power supply switch is switched into ON, so that an electric power is started to be supplied from said battery to said main circuit; and releasing of said connected condition of said charger and said electronic apparatus by said lock mechanism can be conducted only by a condition that said operation section is being operated.

In the electronic apparatus according to the present invention, preferably, until a predetermined delay time has passed after said electronic apparatus was connected to said charger, a power supply from said battery to said main circuit is maintained in a condition that said battery-main circuit power supply switch is ON, when said predetermined delay time has passed after said electronic apparatus was connected to said charger, said power supply from said battery to said main circuit is stopped in a condition that said battery-main circuit power supply switch is OFF.

In the electronic apparatus according to the present invention, preferably, said electronic apparatus further comprising:

switch control means which make said battery-main circuit power supply switch be ON in a case that an amount of power supply to said main circuit is not enough during a charge of said battery.

In the electronic apparatus according to the present invention, a preferable example of the electronic apparatus is a portable telephone, or the other portable-type communication terminal apparatus.

Or else, it is also preferable that the electronic apparatus is a portable-type information terminal apparatus.

A charger according to the present invention which, by being connected to an electronic apparatus having a battery capable of being charged, a main circuit capable of being operable by being supplied with an electric power from said battery, and a battery-main circuit power supply switch for conducting ON/OFF of an electric power supply from said battery to said main circuit, can charge said battery, wherein said charger comprising:

a lock mechanism for keeping said charger and said electronic apparatus in a connected condition with each other;

an operation section by which an user conducts an operation for releasing said connected condition of said charger and said electronic apparatus;

a power supply circuit for producing en electric power supplied to said electronic apparatus; wherein in a condition that said electronic apparatus is removed from said charger, said battery-main circuit power supply switch is switched into ON, so that an electric power is supplied from said battery to said main circuit;

in a condition that said electronic apparatus is connected to said charger, not only said battery is started to be charged by said charger but also said main circuit is started to be supplied with said electric power from said charger, on the other hand, said battery-main circuit power supply switch is switched into OFF, so that an electric power is stopped to be supplied from said battery to said main circuit;

when said user conducts said operation by said operation section in said connected condition of said charger and said electronic apparatus, said battery-main circuit power supply switch is switched into ON, so that an electric power is started to be supplied from said battery to said main circuit; and releasing of said connected condition of said charger and said electronic apparatus by said lock mechanism can be conducted only by a condition that said operation section is being operated.

Further, a charger according to the present invention which can charge a battery of an electronic apparatus by being connected to said electronic apparatus having said battery capable of being charged, a main circuit capable of being operable by being supplied with an electric power from said battery, a battery-main circuit power supply switch for conducting ON/OFF of an electric power supply from said battery to said main circuit, and a charging circuit which divides an electric power supplied from said charger into an electric power supplied to said battery and an electric power supplied to said main circuit, so that the electric power is supplied to said battery and said main circuit, respectively, wherein said charger comprising:

a lock mechanism for keeping said charger and said electronic apparatus in a connected condition with each other;

an operation section by which an user conducts an operation for releasing said connected condition of said charger and said electronic apparatus;

a power supply circuit for producing en electric power supplied to said electronic apparatus; wherein in a condition that said electronic apparatus is removed from said charger, said battery-main circuit power supply switch is switched into ON, so that an electric power is supplied from said battery to said main circuit;

in a condition that said electronic apparatus is connected to said charger, not only said battery is started to be charged by said charger but also said main circuit is started to be supplied with said electric power from said charger, on the other hand, said battery-main circuit power supply switch is switched into OFF, so that an electric power is stopped to be supplied from said battery to said main circuit;

when said user conducts said operation by said operation section in said connected condition of said charger and said electronic apparatus, said battery-main circuit power supply switch is switched into ON, so that an electric power is started to be supplied from said battery to said main circuit; and releasing of said connected condition of said charger and said electronic apparatus by said lock mechanism can be conducted only by a condition that said operation section is being operated.

A charging method according to the present invention which is a method of charging a battery of an electronic apparatus in a charging system comprising said electronic apparatus having said battery capable of being charged, a main circuit capable of being operable by being supplied with an electric power from said battery, a battery-main circuit power supply switch for conducting ON/OFF of an electric power supply from said battery to said main circuit; and a charger which charges said battery in a condition that said electronic apparatus is connected to the charger, wherein said charger comprising:

a lock mechanism for keeping said charger and said electronic apparatus in a connected condition with each other;

an operation section by which an user conducts an operation for releasing said connected condition of said charger and said electronic apparatus;

a power supply circuit for producing en electric power supplied to said electronic apparatus; wherein said charging method comprising:

a first step of switching said battery-main circuit power supply switch into ON, in a condition that said electronic apparatus is removed from said charger, so that an electric power is supplied from said battery to said main circuit;

a second step of not only making said battery be started to be charged by said charger but also making said main circuit be started to be supplied with said electric power from said charger, on the other hand, switching said battery-main circuit power supply switch into OFF, in a condition that said electronic apparatus is connected to said charger, so that an electric power is stopped to be supplied from said battery to said main circuit;

a third step of switching said battery-main circuit power supply switch into ON, when said user conducts said operation by said operation section in said connected condition of said charger and said electronic apparatus, so that an electric power is started to be supplied from said battery to said main circuit; and a fourth step of rendering release of said connected condition of said charger and said electronic apparatus by said lock mechanism to be conducted only by a condition that said operation section is being operated.

Further, a charging method according to the present invention which is a method of charging a battery of an electronic apparatus in a charging system comprising said electronic apparatus having said battery capable of being charged, a main circuit capable of being operable by being supplied with an electric power from said battery, a battery-main circuit power supply switch for conducting ON/OFF of an electric power supply from said battery to said main circuit, and a charging circuit which divides an electric power supplied from said charger into an electric power supplied to said battery and an electric power supplied to said main circuit, so that the electric power is supplied to said battery and said main circuit, respectively; and a charger which charges said battery in a condition that said electronic apparatus is connected to the charger, wherein said charger comprising:

a lock mechanism for keeping said charger and said electronic apparatus in a connected condition with each other;

an operation section by which an user conducts an operation for releasing said connected condition of said charger and said electronic apparatus;

a power supply circuit for producing en electric power supplied to said electronic apparatus; wherein said charging method comprising:

a first step of switching said battery-main circuit power supply switch into ON, in a condition that said electronic apparatus is removed from said charger, so that an electric power is supplied from said battery to said main circuit;

a second step of not only making said battery be started to be charged by said charger through said charging circuit but also making said main circuit be started to be supplied with said electric power from said charger through said charging circuit, on the other hand, switching said battery-main circuit power supply switch into OFF, in a condition that said electronic apparatus is connected to said charger, so that an electric power is stopped to be supplied from said battery to said main circuit;

a third step of switching said battery-main circuit power supply switch into ON, when said user conducts said operation by said operation section in said connected condition of said charger and said electronic apparatus, so that an electric power is started to be supplied from said battery to said main circuit; and a fourth step of rendering release of said connected condition of said charger and said electronic apparatus by said lock mechanism to be conducted only by a condition that said operation section is being operated.

Further, a charging method according to the present invention which is a method of charging a battery of an electronic apparatus in a charging system comprising said electronic apparatus having said battery capable of being charged, a main circuit capable of being operable by being supplied with an electric power from said battery, a battery-main circuit power supply switch for conducting ON/OFF of an electric power supply from said battery to said main circuit; and a charger which charges said battery in a condition that said electronic apparatus is connected to the charger; wherein said charging method comprising:

a first step of switching said battery-main circuit power supply switch into ON, in a condition that said electronic apparatus is removed from said charger, so that an electric power is supplied from said battery to said main circuit;

a second step of not only making said battery be started to be charged by said charger but also making said main circuit be started to be supplied with said electric power from said charger;

a third step of maintaining said battery-main circuit power supply switch in a condition of ON, until a predetermined delay time has passed after said electronic apparatus was connected to said charger, and thereby maintaining a power supply from said battery to said main circuit; and a fourth step of switching said battery-main circuit power supply switch into OFF, when said predetermined delay time has passed after said electronic apparatus was connected to said charger, and thereby stopping said power supply from said battery to said main circuit.

Further, a charging method according to the present invention which is a method of charging a battery of an electronic apparatus in a charging system comprising said electronic apparatus having said battery capable of being charged, a main circuit capable of being operable by being supplied with an electric power from said battery, a battery-main circuit power supply switch for conducting ON/OFF of an electric power supply from said battery to said main circuit, and a charging circuit which divides an electric power supplied from said charger into an electric power supplied to said battery and an electric power supplied to said main circuit, so that the electric power is supplied to said battery and said main circuit, respectively; and a charger which charges said battery in a condition that said electronic apparatus is connected to the charger; wherein said charging method comprising:

a first step of switching said battery-main circuit power supply switch into ON, in a condition that said electronic apparatus is removed from said charger, so that an electric power is supplied from said battery to said main circuit;

a second step of not only making said battery be started to be charged by said charger through said charging circuit but also making said main circuit be started to be supplied with said electric power from said charger through said charging circuit;

a third step of maintaining said battery-main circuit power supply switch in a condition of ON, until a predetermined delay time has passed after said electronic apparatus was connected to said charger, and thereby maintaining a power supply from said battery to said main circuit; and a fourth step of switching said battery-main circuit power supply switch into OFF, when said predetermined delay time has passed after said electronic apparatus was connected to said charger, and thereby stopping said power supply from said battery to said main circuit.

In the charging method according to the present invention, preferably, said charging method further comprising:

a step of judging whether or not an amount of power supply to said main circuit is enough during a charge of said battery; and a step of switching said battery-main circuit power supply switch into ON in a case that an amount of power supply to said main circuit is judged to be not enough during a charge of said battery.

EFFECTS OF THE INVENTION

According to the present invention, in a condition that said electronic apparatus is removed from said charger, said battery-main circuit power supply switch is switched into ON by said switch control signal, so that an electric power is supplied from said battery to said main circuit, in a condition that said electronic apparatus is connected to said charger, not only said battery is started to be charged by said charger but also said main circuit is started to be supplied with said electric power from said charger, on the other hand, said battery-main circuit power supply switch is switched into OFF by said switch control signal, so that an electric power is stopped to be supplied from said battery to said main circuit.

Or else, in a condition that said electronic apparatus is removed from said charger, said battery-main circuit power supply switch is switched into ON by said switch control signal, so that an electric power is supplied from said battery to said main circuit, in a condition that said electronic apparatus is connected to said charger, not only said battery is started to be charged by said charger through said charging circuit but also said main circuit is started to be supplied with said electric power from said charger through said charging circuit, on the other hand, said battery-main circuit power supply switch is switched into OFF by said switch control signal, so that an electric power is stopped to be supplied from said battery to said main circuit.

Accordingly, in a condition that said electronic apparatus is connected to said charger, it is possible to prevent an electric power from being supplied from said battery to said main circuit. Therefore, a charging time can be shortened and a battery capacity can be saved. The battery-main circuit power supply switch can be switched automatically during the charge of the battery. Consequently, without a specific operation by the user, it is possible to avoid a problem that a capacity of the battery is reduced in spite of charging the battery, or that a time for charging the battery becomes long.

Further, when said user conducts said operation by said operation section in said connected condition of said charger and said electronic apparatus, said battery-main circuit power supply switch is switched into ON, so that an electric power is started to be supplied from said battery to said main circuit, and releasing of said connected condition of said charger and said electronic apparatus by said lock mechanism can be conducted only by a condition that said operation section is being operated. Therefore, in a condition that said electronic apparatus is removed from said charger, it is possible without fail that an electric power is started to be supplied from said battery to said main circuit. As a result, the power supply to the main circuit is never temporarily broken.

Furthermore, until a predetermined delay time has passed after said electronic apparatus was connected to said charger, a power supply from said battery to said main circuit is maintained in a condition that said battery-main circuit power supply switch is ON, when said predetermined delay time has passed after said electronic apparatus was connected to said charger, said battery-main circuit power supply switch is switched into OFF, so that said power supply from said battery to said main circuit is stopped. When the electronic apparatus is connected to said charger, it is possible that the power supply to the main circuit is never temporarily broken.

DESCRIPTION OF REFERENCE NUMERALS

Figure 1:
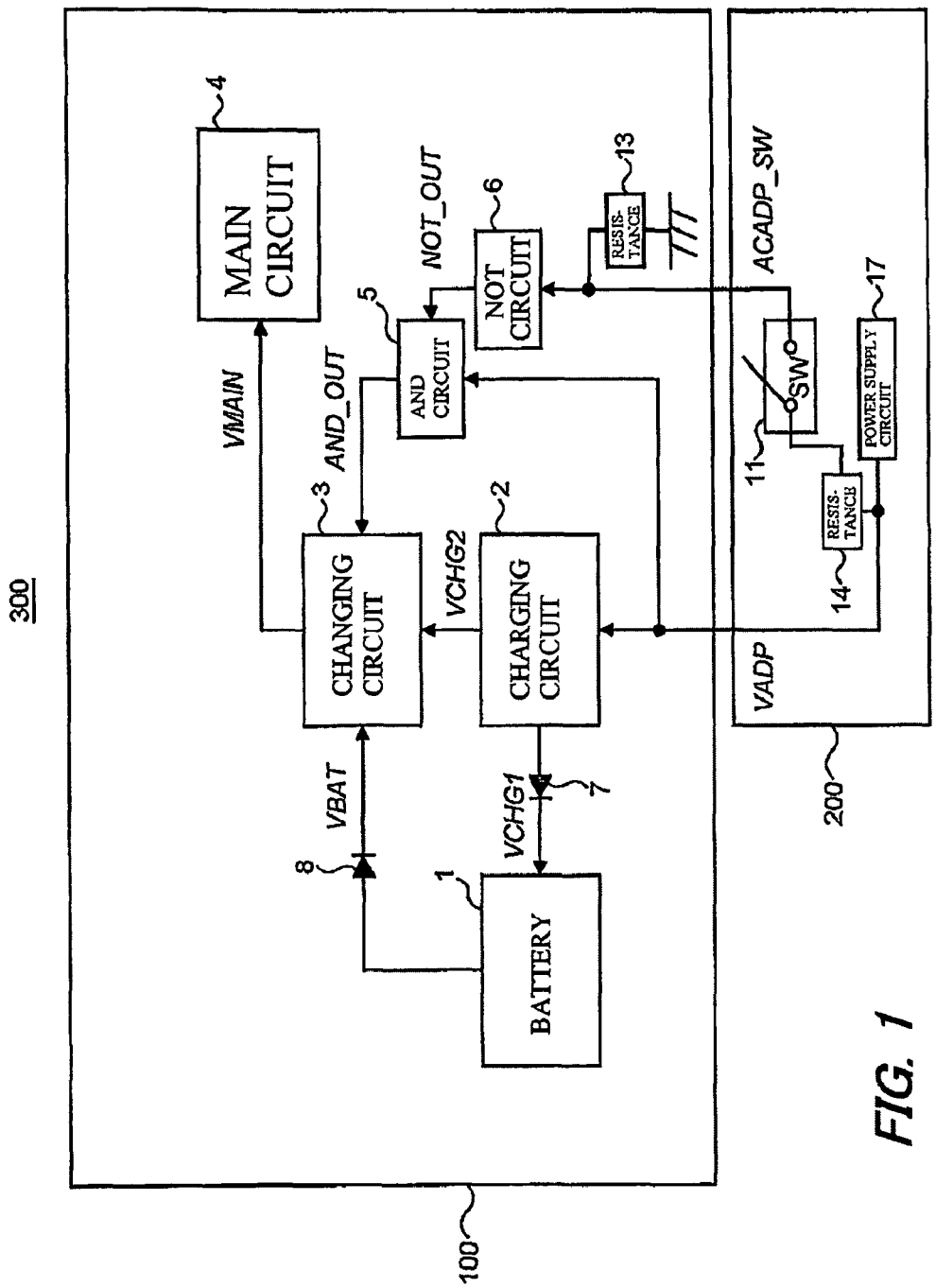
FIG. 1 A view for showing a constitution of a charging system according to a first embodiment of the present invention.

1 battery
2 charging circuit
4 main circuit
5 AND circuit (constitutes a switch control signal producing section)
6 NOT circuit (constitutes a switch control signal producing section)
9 fitting portion
10*a* terminal
10*b* terminal
11 switch (an NOT circuit input changing switch: constitutes an original control signal outputting section, and a switch control signal producing section)
12 operation section
13 resistance
15 lock mechanism
16*a* terminal
16*b* terminal
17 power supply circuit
21 switch (battery-main circuit power supply switch)

23 delay circuit
31 CPU (switch control means)
32 switch
33 current detecting circuit
100 portable telephone (electronic apparatus)
200 AC adapter (charger)
300 charging system

BEST MODE FOR CARRYING OUT THE INVENTION

Hereunder, referring to the drawings, description will be made about embodiments according to the present invention.

First Embodiment

Figure 2:
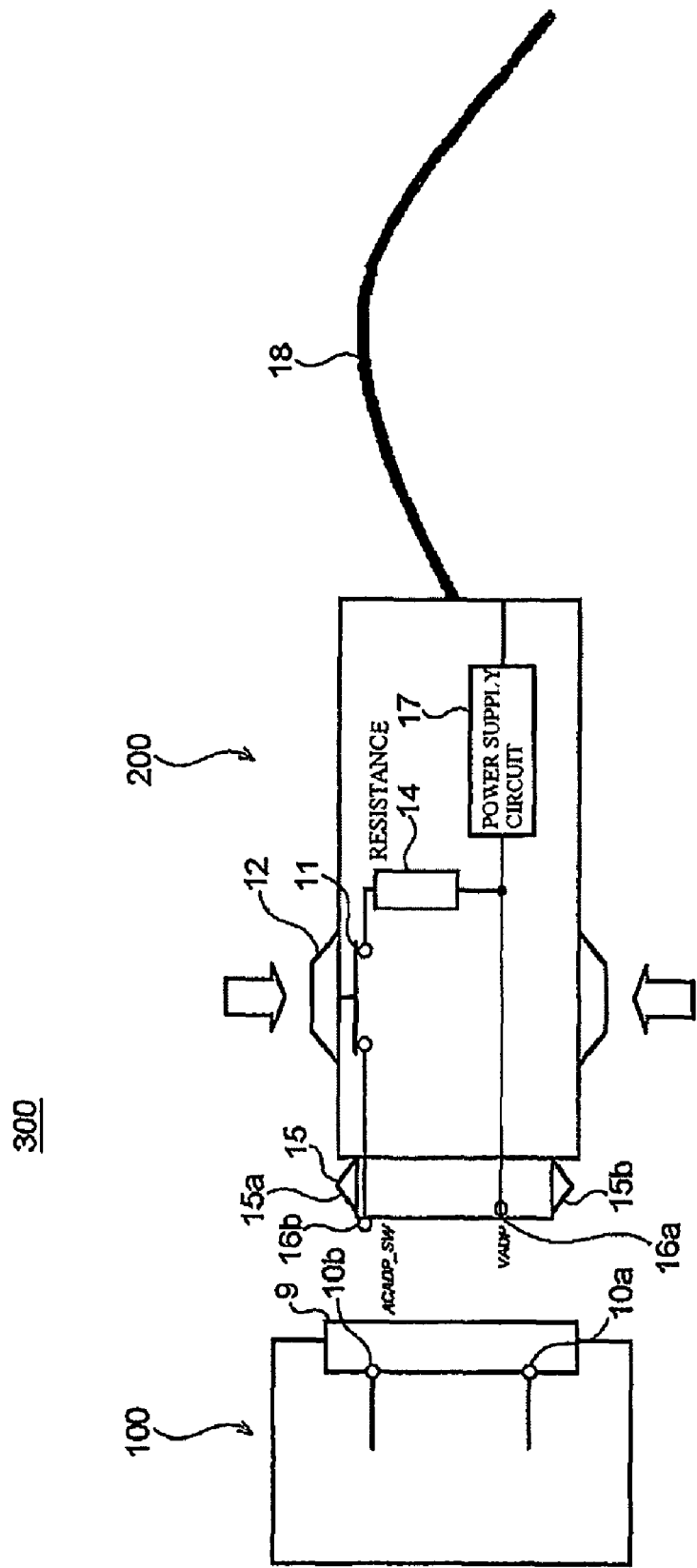
FIG. 2 A schematic view for showing the constitution of the charging system according to the first embodiment of the present invention.
Figure 3:
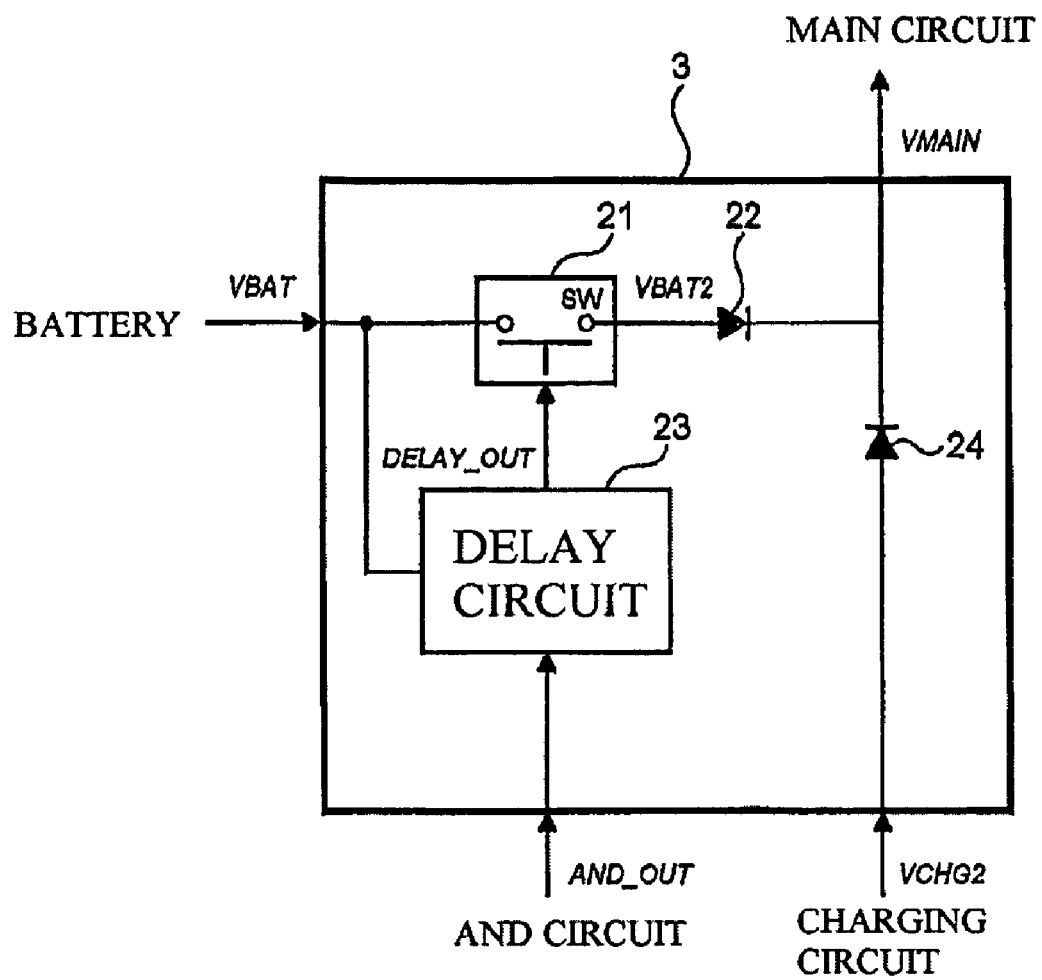
FIG. 3 A view for showing a constitution of a changing circuit provided in a portable telephone according to the first embodiment of the present invention.

FIG. 1 is a view for showing a constitution of a charging system 300 according to a first embodiment of the present invention. FIG. 2 is a schematic view for showing the constitution of the charging system 300. FIG. 3 is a view for showing a constitution of a changing circuit 3 provided in a portable telephone (an electronic apparatus, a portable-type communication terminal apparatus) 100.

As illustrated in FIGS. 1 and 2, the charging system 300 according to the first embodiment of the present invention comprises the portable telephone 100, and an AC adapter 200 to which the portable telephone 100 is connected in a case of charging a battery 1 of the portable telephone 100.

As illustrated in FIG. 1, the portable telephone 100 comprises the battery 1 which is provided to be attachable to the portable telephone 100 and removable from the portable telephone 100, which is capable of being charged, and which functions as a power supply of the portable telephone 100, a charging circuit 2 capable of supplying the battery 1 with an electric power for charging (VCHG1 in FIG. 1) and of supplying a main circuit 4 with an electric power for operation (VCHG2 in FIG. 1), the main circuit 4 which is operable by the use of an electric power (VMAIN in FIG. 1) consisting of at least one of an electric power (VBAT2 in FIG. 3 based on VBAT in FIG. 1) supplied from the battery 1 and an electric power (VCHG2 in FIG. 1) supplied from the charging circuit 2, a changing circuit 3 which changes whether or not the electric power (VBAT2 in FIG. 3 based on VBAT in FIG. 1) supplied from the battery 1 is supplied to the main circuit 4, an AND circuit 5, a NOT circuit 6, a resistance 13, a diode 7 connected serially between the charging circuit 2 and the battery 1, a diode 8 connected serially between the battery 1 and the changing circuit 3, a fitting portion 9 (FIG. 2) fitting into a lock mechanism 15 of an AC adapter 200 which will be later described, and terminals 10a, 10b (FIG. 2) electrically connected with terminals 16a, 16b (FIG. 2) of the AC adapter 200, respectively.

Besides, all the elements operable by the use of a power supply VMAIN in FIG. 1 among elements provided in the portable telephone 100 are called as the main circuit 4. The main circuit 4 includes, for example, a control circuit including CPU and the like, a radio circuit implementing a radio communication, a liquid crystal display device implementing various kinds of display operations, a speaker implementing voice operations, various kinds of light-emitting members, a camera implementing imaging operations, and the like.

As illustrated in FIG. 3, the changing circuit 3 comprises a switch 21 which changes whether or not the electric power (VBAT2 based on VBAT supplied from the battery 1 to the changing circuit 3) supplied from the battery 1 is supplied to the main circuit 4, a diode 22 serially connected between one terminal of the switch 21 and the main circuit 4, a delay circuit 23 to which an output of the AND circuit 5 (AND_OUT which will be later described) is inputted, and a diode 24 serially connected between an output of the charging circuit 2 (an output of VCHG2 in FIG. 1) and the main circuit 4.

An output of the battery 1 is connected to the other terminal of the switch 21 through a diode 8.

Further, the electric power VBAT supplied from the battery 1 is divided before inputted into the switch 21 and thereby inputted also to the delay circuit 23 as a power supply for operation.

As illustrated in FIG. 2, the AC adapter 200 comprises a switch 11, an operation section 12 by which an user conducts an operation for switching the switch 11 into ON, a lock mechanism 15 to which a fitting portion 9 of the portable telephone 100 is fitted in a condition that the portable telephone 100 is connected to the AC adapter 200 for charging the battery 1 of the portable telephone 100, a power supply code 18, a consent plug (not shown in FIG. 2) provided in a head of the power supply code 18, a power supply circuit 17 which is capable of making a commercial alternating current power supply voltage supplied by way of the power supply code 18 be down and converting the alternating current power supply voltage into direct current power supply voltage to produce a power supply of a predetermined voltage (VADP) to be outputted by a predetermined amount of current, a terminal 16a to which an output of the power supply circuit 17 is connected, a resistance 14 connected serially between the output of the power supply circuit 17 and one of the terminals of the switch 11, and a terminal 16b connected to another one of the terminals of the switch 11.

Among these, the terminal 16a comes to be electrically connected to the terminal 10a of the portable telephone 100 in a condition that the portable telephone 100 is connected to the AC adapter 200 for charging.

Further, the terminal 16b comes to be electrically connected to the terminal 10b of the portable telephone 100 in a condition that the portable telephone 100 is connected to the AC adapter 200 for charging.

By inserting the consent plug of the AC adapter 200 into a consent of the commercial power supply, the power is supplied to the AC adapter 200 by way of the power supply code 18, so that the power supply circuit 17 of the AC adapter 200 comes to be in a condition that the power supply circuit 17 produces the power supply (VADP).

Further, when the portable telephone 100 is connected to the AC adapter 200 for charging, the lock mechanism 15 of the AC adapter 200 is fitted to the fitting portion 9 of the portable telephone 100. The portable telephone 100 and the AC adapter 200 thereby come to be a thus locked condition (a condition in which the portable telephone 100 is prevented from being removed from the AC adapter 200). The terminals 10a, 10b come to be electrically connected to the terminals 16a, 16b, respectively.

Concretely, the lock mechanism 15 has, for example, projectable portions 15a, 15b on both ends thereof. When the portable telephone 100 is connected to the AC adapter 200, the projectable portions 15a, 15b project on both ends of the lock mechanism 15. The projectable portions 15a, 15b are thereby fitted into the fitting portions 9, so that the portable telephone 100 and the AC adapter 200 come to be the locked condition.

While the lock mechanism 15 and the fitting portions 9 are fitting to each other, not only the terminal 10a and the terminal 16a are maintained to be in an electrically connected condition but also the terminal 10b and the terminal 16b are maintained to be in an electrically connected condition.

The fitting condition between the lock mechanism 15 and the fitting portions 9 can be released only in a condition that the operation section 12 has been pushed down to be operated and thereby the switch 11 has been switched into ON. Namely, once the portable telephone 100 has been connected to the AC adapter 200, the portable telephone 100 cannot be removed from the AC adapter 200 until the operation section 12 has been pushed down and thereby the switch 11 has been switched into ON.

In the condition that the operation section 12 has been pushed down and thereby the switch 11 has been switched into ON, a pair of the projectable portions 15a, 15b of the lock mechanism 15 are returned to their non-projecting position and removed from the fitting portions 9. As a result, the portable telephone 100 can be removed from the AC adapter 200.

Besides, the projectable portions 15a, 15b of the lock mechanism 15 are mechanically co-operated with the pushing down operation of the operation section 12 and thereby returned to their non-projecting position. Consequently, the projectable portions 15a, 15b are removed from the fitting portions 9.

In a condition that not only the AC adapter 200 is connected to the commercial power supply but also the portable telephone 100 is connected to the AC adapter 200, the power supply (VADP) produced by the power supply circuit 17 of the AC adapter 200 is supplied to the charging circuit 2 through the terminals 16a and 10a.

The charging circuit 2 divides the power supply (VADP) from the AC adapter 200 into two power supplies, VCHG1 and VCHG2.

The charging circuit 2 is capable of supplying the main circuit 4 with VCHG2 among the two power supplies.

Besides, an anode of the diode 24 (FIG. 3) serially provided in a supplying route of the VCHG2 is connected to the side of the charging circuit 2 while a cathode thereof is connected to the side of the main circuit 4. As a result, VCHG2 can be prevented from reverse flow from the side of the main circuit 4 to the side of the charging circuit 2 by the diode 24.

Further, the charging circuit 2 is capable of charging the battery 1 by supplying the battery 1 with the VCHG1.

Besides, an anode of the diode 7 serially provided in a supplying route of the VCHG1 is connected to the side of the charging circuit 2 while a cathode thereof is connected to the side of the battery 1. As a result, VCHG1 can be prevented from reverse flow from the side of the battery 1 to the side of the charging circuit 2 by the diode 7.

The battery 1 is capable of supplying the main circuit 4 with the power supply (VBAT2 based on VBAT outputted from the battery 1 to the changing circuit 3) through the changing circuit 3.

Namely, the changing circuit 3 supplies the main circuit 4 with the VBAT2 based on the VBAT from the battery 1, when the switch 21 in FIG. 3 is ON. On the other hand, the changing circuit 3 does not supply the main circuit 4 with the VBAT2, when the switch 21 in FIG. 3 is OFF.

Besides, an anode of the diode 8 serially provided in a supplying route of the power supply VBAT from the battery 1 to the changing circuit 3 is connected to the side of the battery 1 while a cathode thereof is connected to the side of the changing circuit 3. As a result, the VBAT can be prevented from reverse flow from the side of the changing circuit 3 to the side of the battery 1 by the diode 8.

Further, an anode of the diode 22 serially provided in a supplying route of the VBAT2 from the switch 21 to the main circuit 4 is connected to the side of the switch 21 while a cathode thereof is connected to the side of the main circuit 4.

As a result, the VBAT2 can be prevented from reverse flow from the side of the main circuit 4 to the side of the switch 21 by the diode 22.

An output signal (AND_OUT) of the AND circuit 5 is inputted into a control terminal of the switch 21 through the delay circuit 23. The switch 21 is adjusted to be ON/OFF dependent whether the output signal is H (High) or L (Low).

Concretely, a switch which becomes ON when the signal inputted to the control terminal is L is, for example, used as the switch 21.

Further, the VADP supplied from the AC adapter 200 to the portable telephone 100 is, for example, divided within the portable telephone 100 and is also supplied to one of the two input terminals provided in the AND circuit 5.

Further, the VADP outputted from the power supply circuit 17 is also supplied to an input terminal of the NOT circuit 6 through the resistance 14, the switch 11, the terminals 16b, and 10b, when not only the portable telephone 100 has been connected to the AC adapter 200 but also the switch 11 has been switched into ON.

Besides, the signal thus inputted from the AC adapter 200 to the input terminal of the NOT circuit 6 is called "ACADP_SW (FIG. 1)".

A potential of the input terminal of the NOT circuit 6 becomes "H", when not only the portable telephone 100 has been connected to the AC adapter 200 but also the switch 11 has been switched into ON.

Herein, the input terminal of the NOT circuit 6 is connected to the ground potential through the resistance 13. As a result, when the switch 11 has been switched into OFF or the portable telephone 100 has been removed from the AC adapter 200, the input terminal of the NOT circuit 6 becomes the ground potential, namely, "L".

Further, the resistance 14 is for dividing the VADP into a component supplied to the portable telephone 100 through the terminals 16a and 10a and another component supplied to the input terminal of the NOT circuit 6 through the resistance 14, the switch 11, and the terminals 16b and 10b by an appropriate divided rate.

An output terminal of the NOT circuit 6 is connected to an input terminal of the other side of the AND circuit 5. Besides, the signal thus inputted from the output terminal of the NOT circuit 6 to the input terminal of the AND circuit 5 is called "NOT_OUT (FIG. 1)".

The AND circuit 5 outputs the AND_OUT, that is, an AND output of an output (NOT_OUT) from the NOT circuit 6 and the VADP, from the output terminal of the AND circuit 5 to the delay circuit 23 (FIG. 3) within the changing circuit 3.

The delay circuit 23 delays the AND_OUT by a predetermined delay time to be outputted to the control terminal of the switch 21 (outputs DELAY_OUT of FIG. 3).

Besides, in the above, the switch control signal producing section is constructed by the AND circuit 5, the NOT circuit 6, the switch 11, the resistance 13, and the resistance 14. Among these, a NOT circuit input changing switch of the original control signal output section is constructed by the switch 11.

Next, description is made about the operation.

Figure 4:
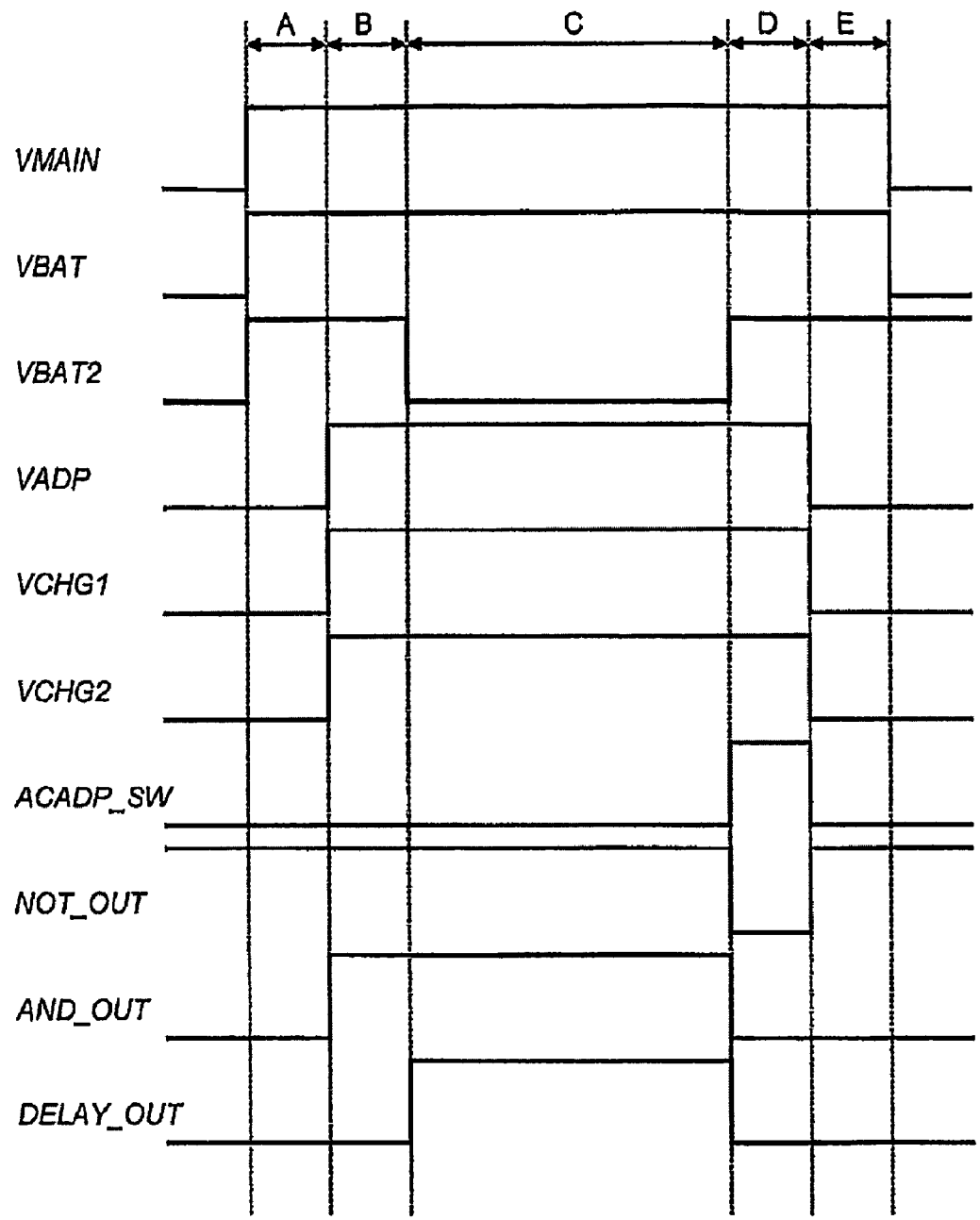
FIG. 4 A time chart for explaining a flow of operations of the charging system according to the first embodiment of the present invention.

FIG. 4 is a time chart for explaining a flow of operations of the charging system 300.

Hereunder, description will be made about operations of periods A~E illustrated in FIG. 4 sequentially.

<Operations of Period A>

The period A illustrated in FIG. 4 is a period starting from the time in which the battery 1 has been attached to the portable telephone 100 in a condition that the portable telephone 100 is not connected to the AC adapter 200.

In the period A, supply of the electric power to the main circuit 4 is implemented from the battery 1.

The operations of period A are described below in detail.

Since the portable telephone 100 is not connected to the AC adapter 200, the power supply VADP from the AC adapter 200 and the power supplies VCHG1 and VCHG2 from the charging circuit 2 become "L" the electric power is not supplied).

Since the portable telephone 100 is not connected to the AC adapter 200, the output ACADP_SW from the switch 11 of the AC adapter 200 becomes "L". As a result, the NOT_OUT that is an output from the NOT circuit 6 becomes "H".

The AND_OUT that is an output from the AND circuit 5 is "L", since VADP is "L" and the NOT_OUT inputted from the NOT circuit 3 is "H".

When the AND_OUT that is an output from the AND circuit 5 is "L", the DELAY_OUT that is an output from the delay circuit 23 is also "L". The switch 21 is thereby ON. Accordingly, the VBAT2 based on VBAT from the battery 1 is supplied to the main circuit 4 through the switch 21 and the diode 22.

Namely, in the period A, the VMAIN is the VBAT2 based on VBAT from the battery 1.

<Operations of Period B>

The period B illustrated in FIG. 4 is a period starting from the time in which the portable telephone 100 has been connected to the AC adapter 200 and ending by the time the delay time by the delay circuit 23 has passed, in a condition that the battery 1 is connected to the portable telephone 100. Further, in the period B, the operation section 12 is not pushed down, so that the switch 11 is OFF.

When the portable telephone 100 is connected to the AC adapter 200, supply of the electric power to the main circuit 4 is changed from the battery 1 into the charging circuit 2. However, the delay circuit 23 is provided within the changing circuit 3. Consequently, supply of the electric power to the main circuit 4 is implemented from both the battery 1 and the charging circuit 2 during a predetermined delay time.

Thereby, when a source of supplying the electric power to the main circuit 4 is changed from the battery 1 into the charging circuit 2, it is possible to prevent the power supply to the main circuit 4 from being temporarily broken. Besides, a charge of the battery 1 starts from the period B.

The operations of period B are described below in detail.

When the portable telephone 100 has been connected to the AC adapter 200, the lock mechanism 15 of the AC adapter 200 is fitted to the fitting portions 9 of the portable telephone 100. The portable telephone 100 and the AC adapter 200 thereby come to be the locked condition. The terminals 10a, 10b come to be electrically connected to the terminals 16a, 16b, respectively.

Accordingly, the VADP from the AC adapter 200 is supplied to the charging circuit 2 and one of the input terminals provided in the AND circuit 5. As a result, the VADP supplied to one of the input terminals provided in the AND circuit 5 becomes "H".

The ACADP_SW that is an output of the switch 11 of the AC adapter 200 becomes "L", since the switch 11 is not ON. The NOT_OUT that is the output of the NOT circuit 6 becomes "H".

The AND_OUT that is the output of the AND circuit 5 becomes "H", since the VADP from the AC adapter 200 is "H" and NOT_OUT from the NOT circuit 6 is also "H".

While the predetermined delay time has passed after the AND_OUT that is the output of the AND circuit 5 became "H", the DELAY_OUT that is an output from the delay circuit 23 is still "L" and the switch 21 of the changing circuit 3 is still ON. As a result, the VBAT2 that is an output from the switch 21 is maintained to be supplied to the main circuit 4.

Further, the VADP is supplied from the AC adapter 200 to the charging circuit 2, the charging circuit 2 outputs the VCHG2 to the changing circuit 3. The VCHG2 is supplied to the main circuit 4 through the diode 24 within the changing circuit 3.

Namely, in the period B, both the VBAT2 from the battery 1 and the VCHG2 from the charging circuit 2 are supplied to the main circuit 4 as the power supply (VMAIN).

Thus, the electric power is supplied to the main circuit 4 from both the battery 1 and the charging circuit 2 during the delay time by the delay circuit 23. This is for the purpose of preventing the power supply from being shut down, at a moment when the power supply (VMAIN) to the main circuit 4 is changed from the VBAT2 based on the output of the battery 1 into the VCHG2 that is the output of the charging circuit 2.

Besides, from the period B, the VCHG1 is supplied to the battery 1 from the charging circuit 2 for charging the battery 1, so that the battery 1 is charged.

<Operations of Period C>

The period C illustrated in FIG. 4 is a period starting from the time in which the delay time by the delay circuit 23 has passed after the portable telephone 100 has been connected to the AC adapter 200, in a condition that the battery 1 is connected to the portable telephone 100.

In the previous period B, by the operation of the delay circuit 23, the supply of the electric power to the main circuit 4 is implemented from both the battery 1 and the charging circuit 2. On the other hand, in the period C, the supply of the electric power to the main circuit 4 is implemented only from the charging circuit 2.

Besides, also in the period C, similarly to the period B, the electric power is supplied to the battery 1 from the charging circuit 2 for charging the battery 1, so that the battery 1 is charged.

The operations of period C are described below in detail.

When the predetermined delay time by the delay circuit 23 has passed after the portable telephone 100 has been connected to the AC adapter 200, the DELAY_OUT that is an output from the delay circuit 23 is changed from "L" into "H". The switch 21 of the changing circuit 3 is therefore changed from ON into OFF. As a result, the VBAT2 comes not to be outputted to the main circuit 4. In other words, the VBAT that is an output from the battery 1 is separated from the route of supplying the electric power to the main circuit 4.

Accordingly, in the period C, only the VCHG2 from the charging circuit 2 is supplied to the main circuit 4 as the power supply (VMAIN).

Besides, also in the period C, the VCHG1 is supplied to the battery 1 from the charging circuit 2 for charging the battery 1, so that the battery 1 is charged.

<Operations of Period D>

The period D illustrated in FIG. 4 is a period in which the user pushed down the operation section 12 of the AC adapter 200 to be operated to make the switch 11 be ON, but in which the portable telephone 100 is still maintained in a condition to be connected to the AC adapter 200.

As described above, the portable telephone 100 cannot structurally be removed from the AC adapter 200, if the switch 11 is not ON. For removing the portable telephone 100 from the AC adapter 200, it is therefore necessary to operate the operation section 12 to make the switch 11 be ON.

The predetermined delay time by the delay circuit 23 has passed after the switch 11 of the AC adapter 200 became ON, the switch 21 of the changing circuit 3 becomes ON. The power supply from the battery 1 to the main circuit 4 is restarted.

Further, even if the switch 11 of the AC adapter 200 is ON, the power supply from the charging circuit 2 to the main circuit 4 is continuously maintained unless the portable telephone 100 is removed from the AC adapter 200.

Consequently, supply of the electric power to the main circuit 4 is implemented from both the battery 1 and the charging circuit 2 during the period D.

Further, the portable telephone 100 is in a condition that the portable telephone 100 is continuously connected to the AC adapter 200 in the period D. Power feeding from the charging circuit 2 to the battery 1 is continuously maintained, so that the battery 1 is continuously charged.

The operations of period D are described below in detail.

In order to remove the portable telephone 100 from the AC adapter 200, it is necessary that the operation section 12 of the AC adapter 200 is operated to make the switch 11 be ON and thereby that the fitted condition of the lock mechanism 15 of the AC adapter 200 and the fitting portion 9 of the portable telephone 100 is released. Namely, the portable telephone 100 cannot be removed from the AC adapter 200 unless the portable telephone 100 is removed from the AC adapter 200 with the operation section 12 being pushed down.

When the operation section 12 of the AC adapter 200 is operated and the switch 11 of the AC adapter 200 is thereby switched into ON, a pair of the projectable portions 15a, 15b of the lock mechanism 15 are returned to their non-projecting position and removed from the fitting portions 9. As a result, the portable telephone 100 can be removed from the AC adapter 200.

When the operation section 12 of the AC adapter 200 is operated and the switch 11 of the AC adapter 200 is thereby switched into ON, the ACADP_SW that is the output of the switch 11 becomes "H". As a result, the NOT_OUT that is the output from the NOT circuit 6 becomes "L".

Further, "L" from the NOT circuit 6 and the VADP="H" that is a power supply from the AC adapter 200 are inputted to the AND circuit 5. Consequently, the AND_OUT that is an output from the AND circuit 5 becomes "L".

The predetermined delay time by the delay circuit 23 has passed after the AND_OUT that is an output from the AND circuit 5 became "L", the DELAY_OUT that is an output from the delay circuit 23 also becomes "L". Herein, the delay time by the delay circuit 23 is assured to be extremely shorter than a time needed for conducting an operation to push down the operation section 12 of the AC adapter 200 and remove the portable telephone 100 from the AC adapter 200. Accordingly, substantially as soon as the user pushes down the operation section 12, the DELAY_OUT that is an output from the delay circuit 23 becomes "L".

When the DELAY_OUT that is an output from the delay circuit 23 also becomes "L", the switch 21 of the changing circuit 3 becomes ON. Consequently, the VBAT2 is outputted from the switch 21 to the main circuit 4.

Further, the portable telephone 100 is in a condition that the portable telephone 100 is continuously connected to the AC adapter 200 in the period D. The VCHG2 from the charging circuit 2 is maintained in a condition that the VCHG2 is supplied to the main circuit 4.

Namely, in the period D, both the VBAT2 from the battery 1 and the VCHG2 from the charging circuit 2 are supplied to the main circuit 4 as the power supply (VMAIN).

In addition, from the period D, the VCHG1 is supplied to the battery 1 from the charging circuit 2 for charging the battery 1, so that the battery 1 is charged.

<Operations of Period E>

The period E illustrated in FIG. 4 is a period in a condition that the portable telephone 100 is being removed from the AC adapter 200. The period E is similar to the period A.

Namely, in the period E, since the portable telephone 100 is not connected to the AC adapter 200, the VADP that is a power supply from the AC adapter 200, the VCHG1 and VCHG2 that is a power supply from the charging circuit 2 become "L".

Further, the ACADP_SW that is the output from the switch 11 of the AC adapter 200 becomes "L", since the portable telephone 100 is not connected to the AC adapter 200. As a result, a potential of the input terminal of the NOT circuit 6 is flown to the ground through the resistance 13 and thereby becomes "L". As a result, the NOT_OUT that is an output from the NOT circuit 6 becomes "H".

The AND_OUT that is an output from the AND circuit 5 becomes "L", since the VADP is "L" and the NOT_OUT inputted from the NOT circuit 3 is "H".

In addition, since the DELAY_OUT that is an output from the delay circuit 23 is also "L", the switch 21 is thereby ON. Accordingly, the VBAT2 based on VBAT from the battery 1 is supplied to the main circuit 4 through the switch 21 and the diode 22.

Namely, in the period E, the VMAIN is the VBAT2 based on VBAT from the battery 1, similarly to the period A.

According to the first embodiment mentioned above, the following advantageous effects can be obtained.

The first advantageous effect is that a capacity of the battery 1 can be saved. The reason is that, a power supply route from the battery 1 to the main circuit 4 is separated, when the portable telephone 100 is connected to the AC adapter 200, the power supply by the battery 1 is therefore changed into the power supply by the charging circuit 2.

The second advantageous effect is that a charging time can be shortened. The reason is that, a power supply route from the battery 1 to the main circuit 4 is separated, when the portable telephone 100 is connected to the AC adapter 200, the power supply by the battery 1 is therefore changed into the power supply by the charging circuit 2, and then the battery 1 is charged in such a condition.

The third advantageous effect is that the power supply to the main circuit 4 can be prevented from being temporarily broken, when the portable telephone 100 is removed from the AC adapter 200. The reason is that, the portable telephone 100 cannot be removed from the AC adapter 200 unless the switch 11 of the AC adapter 200 is ON, in addition, when the switch 11 of the AC adapter 200 becomes ON, the power supply from the battery 1 to the main circuit 4 is restarted.

The fourth advantageous effect is that the power supply to the main circuit 4 can be prevented from being temporarily broken, when the a power supply route from the battery 1 to the main circuit 4 is separated. The reason is that, when the portable telephone 100 is connected to the AC adapter 200, separation of the power supply route from the battery 1 to the main circuit 4 is conducted after the predetermined delay time has passed.

Second Embodiment

Figure 5:
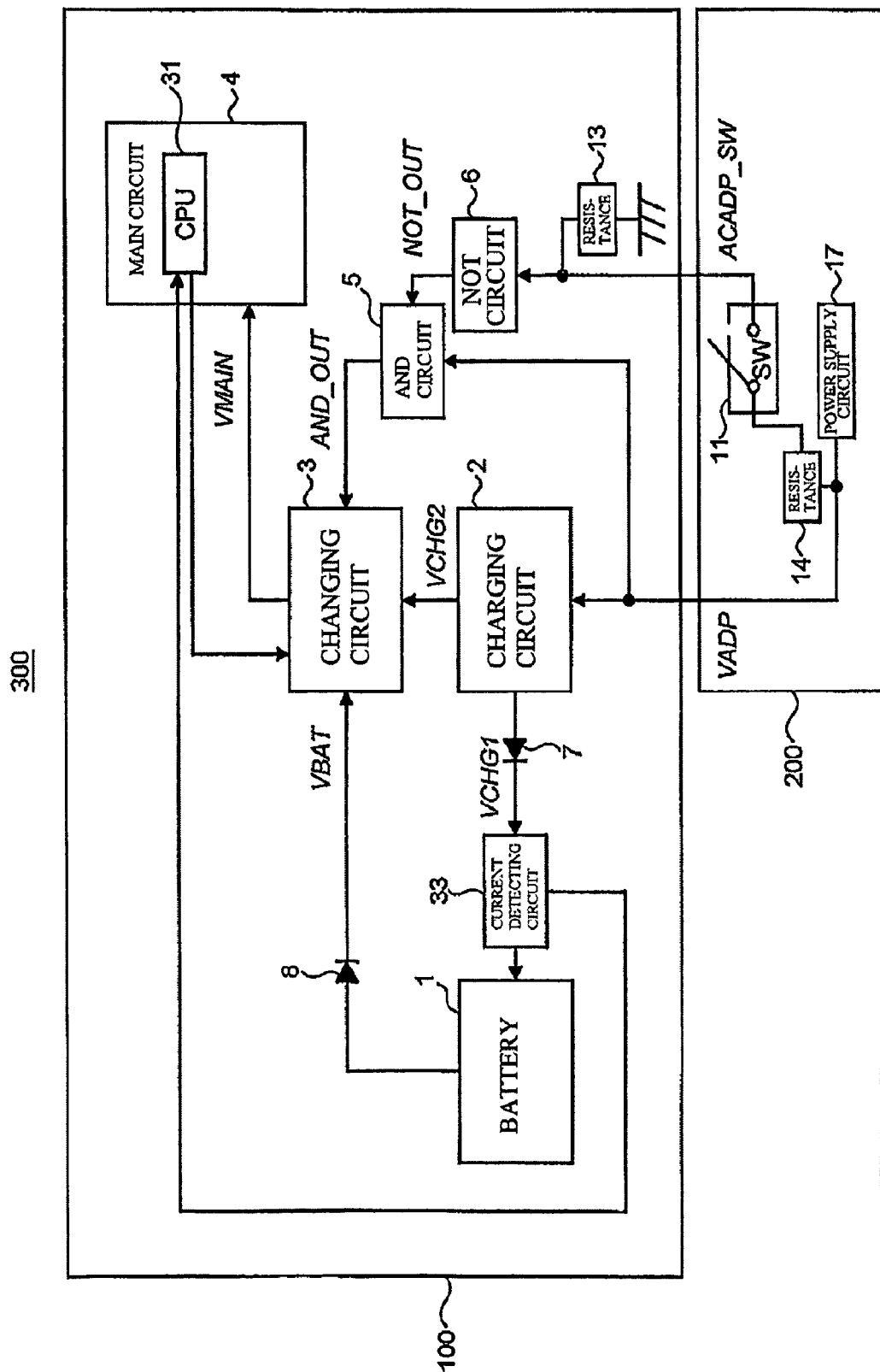
FIG. 5 A view for showing a constitution of a charging system according to a second embodiment of the present invention.
Figure 6:
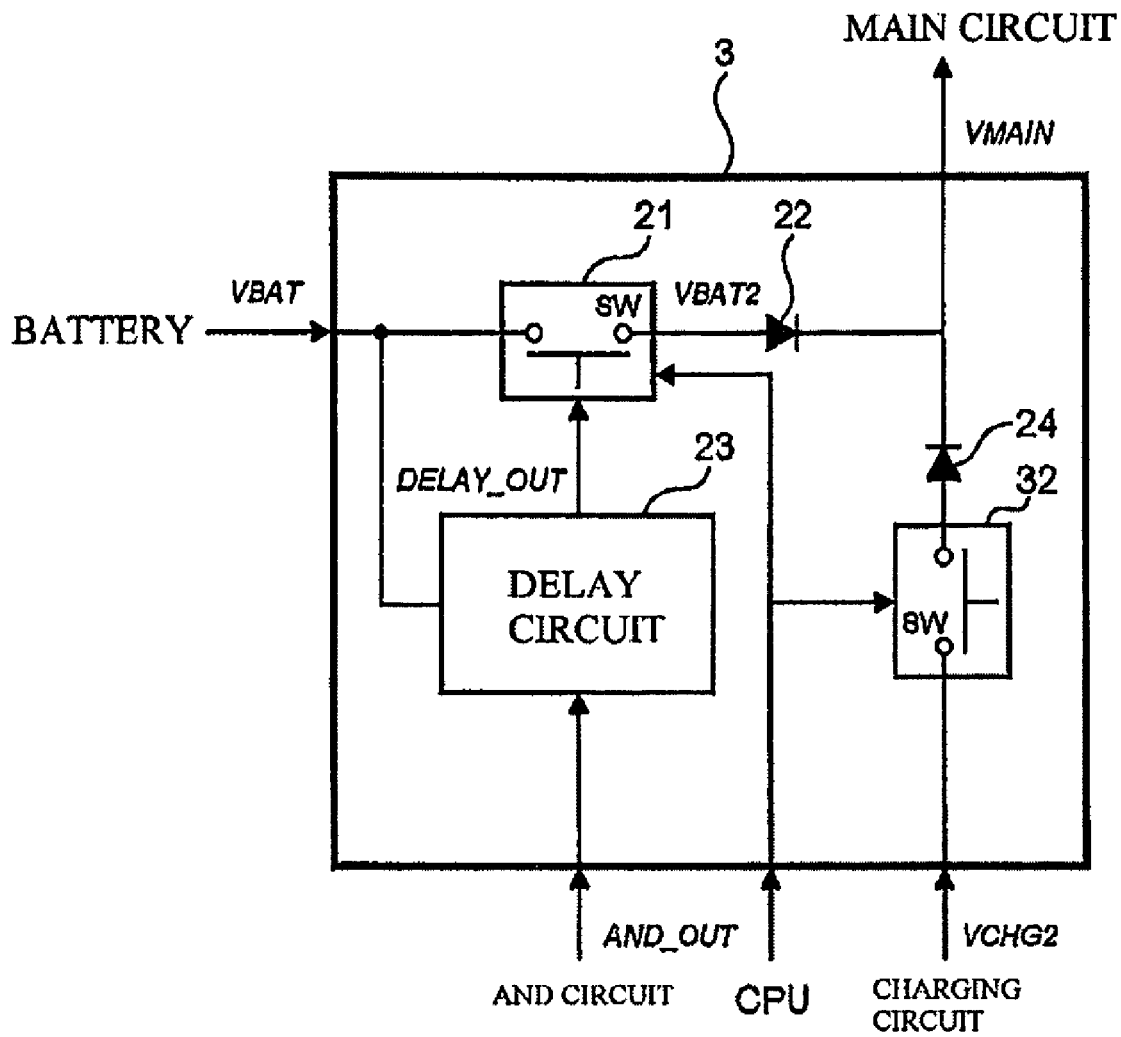
FIG. 6 A view for showing a constitution of a changing circuit provided in the charging system according to the second embodiment of the present invention.

FIG. 5 is a view for showing a constitution of a charging system 300 according to the second embodiment of the present invention. FIG. 6 is a view for showing a constitution of a changing circuit 3 provided in the charging system 300 according to the second embodiment of the present invention.

The second embodiment is different from the above-described first embodiment only in points that, as illustrated in FIG. 5, the second embodiment has a current detecting circuit 33 for detecting an amount of current of the VCHG1 in a supply route of the VCHG1, that, as illustrated in FIG. 6, the second embodiment has a switch 32 for rendering supply of the VCHG2 to the main circuit 4 to be stopped in a supply route of the VCHG2, and that a CPU (switch control means) 31 illustrated in FIG. 5 is capable of carrying out ON/OFF control of the switch 32 and the switch 21.

The CPU 31 totally controls operations of the portable telephone 10, and is included in the main circuit 4.

The current detecting circuit 33 detects an amount of current of the VCHG1 supplied from the charging circuit 2 to the battery 1 and then inputs a result of the detection to the CPU 31.

Herein, if an amount of current consumed in the main circuit 4 is increased, the amount of current of the VCHG1 is reduced.

In a case that a value of the VCHG1 is below a predetermined threshold value, the CPU 31 judges that supply of current by the power supply (VCHG2) supplied from the AC adapter 200 to the main circuit 4 through the charging circuit 2 is not enough. The CPU 31 then makes the switch 21 be ON and, on the other hand, the switch 32 be OFF. The CPU 31 thereby changes the power supply to the main circuit 4 from VCHG2 into VBAT2. Besides, in the change of the power supply, the switch 32 is made OFF after a predetermined time has passed from the time that the switch 21 has been made ON. Thereby, the power supply to the main circuit 4 can be prevented from being temporarily broken in the change of the power supply.

Besides, a source of the power supply to the main circuit 4 is thus changed from the charging circuit 2 to the battery 1 by the judge of the CPU 31. This is preferably conducted only in, for example, the period C illustrated in FIG. 4.

According to the second embodiment mentioned above, the source of the power supply to the main circuit 4 is changed from the charging circuit 2 to the battery 1 by the judge of the CPU 31. The power supply can be changed at a timing other than the timing that the AC adapter 200 is attached to or removed from the portable telephone 100.

Besides, in the above-described second embodiment, if the CPU 31 judges that supply of current by the power supply (VCHG2) supplied from the AC adapter 200 to the main circuit 4 through the charging circuit 2 is not enough, the CPU 31 may make the switch 32 be ON so that both the VCHG2 and the VBAT2 may be supplied to the main circuit 4.

Further, in the above-described second embodiment, the CPU 31 may judge an electric power consumed by the main circuit 4 responsive to a content of processing by the main circuit 4. In this case, the CPU 31 may make the switch 21, 32 be ON/OFF when the power supply to the main circuit 4 is not enough. Namely, the portable telephone 100 has, for example, a memorizing section (not shown) in which relation between each of various processing by the main circuit 4 (processing during communication, processing during music reproduction, and the like) and a current value required for each processing is memorized and stored as a table. The CPU 31 always monitor the content of the processing by the main circuit 4 and then compare the result of monitoring with the table. Thus, the CPU 31 may judge whether or not the power supply to the main circuit 4 is enough. The judgment of consumed electric power responsive to a content of processing by the main circuit 4 thus described can be preferably implemented in addition to the judgment in accordance with a result of monitoring a current value of the VCHG1 described in the above second embodiment.

Further, in each embodiment mentioned above, description was made about a constitution that the AND circuit 5, the NOT circuit 6 and the resistance 13 are provided in the portable telephone 100, and that the output (ACADP_SW) from the switch 11 is outputted from the AC adapter 200 to the portable telephone 100 through the terminals 16b and 10b. However, considered is an alternative constitution that the AND circuit 5, the NOT circuit 6 and the resistance 13 are provided in the AC adapter 200, and that the output from the AND circuit 5 is outputted from the AC adapter 200 to the portable telephone 100 through the terminals 16b and 10b.

In addition, in each embodiment mentioned above, description was made about a constitution that the AND circuit 5, the NOT circuit 6 and the resistance 13 are disposed outside the changing circuit 3 within the portable telephone 100. However, the AND circuit 5, the NOT circuit 6 can be disposed within the changing circuit 3 or the AND circuit 5, the NOT circuit 6 and the resistance 13 can be disposed within the changing circuit 3.

Figure 7:
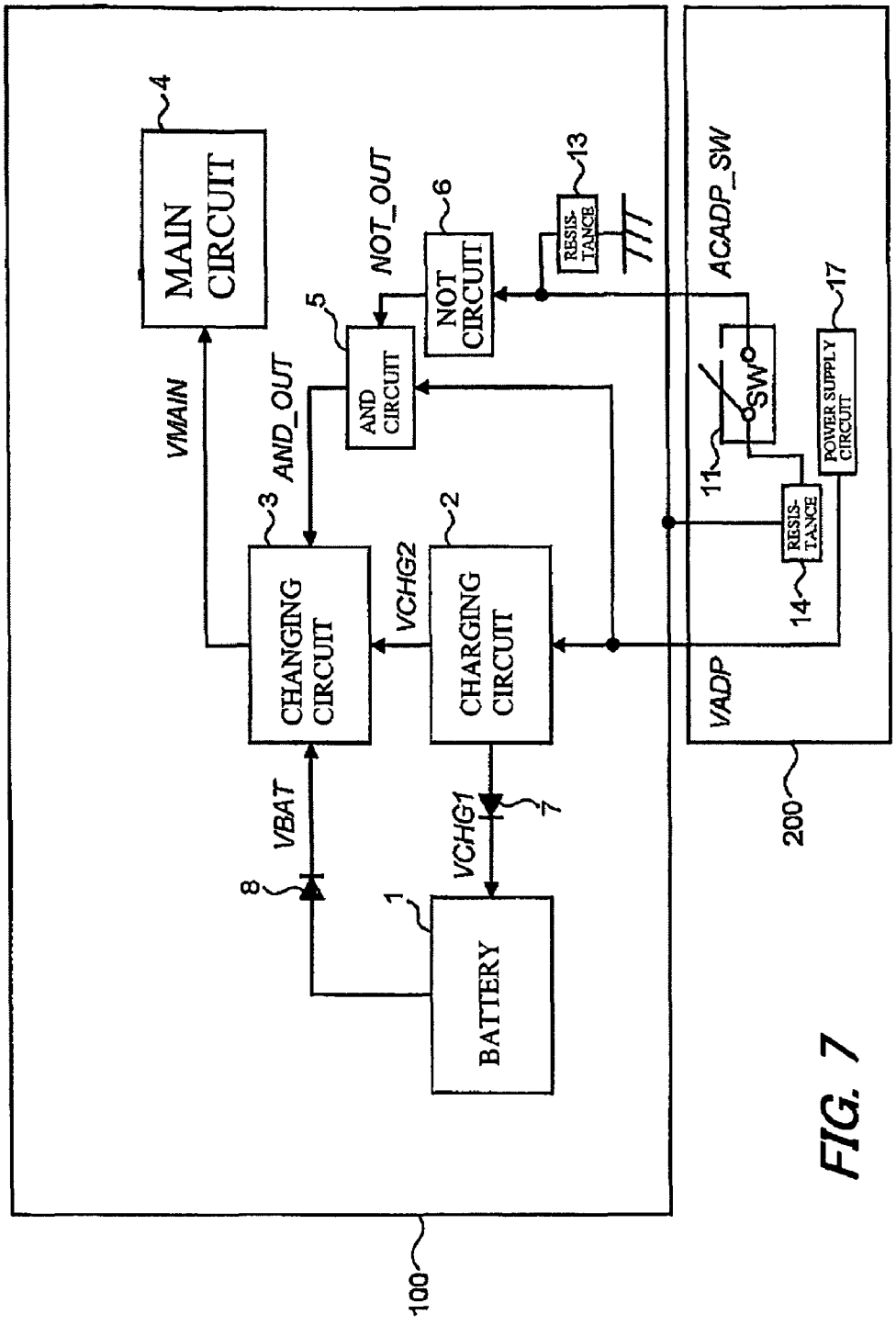
FIG. 7 A view for showing an example of variation of a charging system.

Furthermore, in each embodiment mentioned above, description was made about an example that an end of the resistance 14 of the AC adapter 200 (an end other than the end connected to the switch 11) is connected to a supply route of the VADP within the AC adapter 200, as illustrated in FIGS. 1 and 5. However, as illustrated, for example, in FIG. 7, the end of the resistance 14 may be connected to the supply route of the VADP within the portable telephone 100 through non-illustrated terminals between the AC adapter 200 and the portable telephone 100.

Moreover, in each embodiment mentioned above, description was made about an example that the portable telephone 100 has the charging circuit 2. However, a constitution corresponding to the charging circuit 2 may be provided in the side of the AC adapter 200.

Further, in each embodiment mentioned above, description was made about an example that the charging system according to the present invention was applied to the portable telephone 100. However, the present invention is not restricted to the example but can also be applied to a portable terminal information apparatus other than a portable telephone (PHS, PDA, Electronic Note, or the like) and a communication terminal apparatus other than a portable telephone (PHS, PDA, or the like). Moreover, the present invention is not restricted to these examples but can also be applied to the other electronic apparatuses that need a charge thereof.

The invention claimed is:

1. A charging system having an electronic apparatus which has a battery capable of being charged, and a charger which charges said battery in a condition that said electronic apparatus is connected to the charger, said electronic apparatus comprising:

a main circuit which is capable of being operable by being supplied with an electric power from said battery;

a battery-main circuit power supply switch for conducting ON/OFF of an electric power supply from said battery to said main circuit;

said charging system further comprising:

a switch control signal producing section for producing a switch control signal which switches ON/OFF of said battery-main circuit power supply switch, dependent on whether or not said electronic apparatus is connected to said charger; wherein;

in a condition that said electronic apparatus is removed from said charger, said battery-main circuit power supply switch is switched into ON by said switch control signal, so that an electric power is supplied from said battery to said main circuit;

in a condition that said electronic apparatus is connected to said charger, not only said battery is started to be charged by said charger but also said main circuit is started to be supplied with said electric power from said charger, on the other hand, said battery-main circuit power supply switch is switched into OFF by said switch control signal, so that an electric power is stopped to be supplied from said battery to said main circuit.

2. A charging system having an electronic apparatus which has a battery capable of being charged, and a charger which charges said battery in a condition that said electronic apparatus is connected to the charger, said electronic apparatus comprising:
a main circuit which is capable of being operable by being supplied with an electric power from said battery;
a battery-main circuit power supply switch for conducting ON/OFF of an electric power supply from said battery to said main circuit;
a charging circuit which divides an electric power supplied from said charger into an electric power supplied to said battery and an electric power supplied to said main circuit, so that the electric power is supplied to said battery and said main circuit, respectively;
said charging system further comprising:
a switch control signal producing section for producing a switch control signal which switches ON/OFF of said battery-main circuit power supply switch, dependent on whether or not said electronic apparatus is connected to said charger; wherein;
in a condition that said electronic apparatus is removed from said charger, said battery-main circuit power supply switch is switched into ON by said switch control signal, so that an electric power is supplied from said battery to said main circuit;
in a condition that said electronic apparatus is connected to said charger, not only said battery is started to be charged by said charger through said charging circuit but also said main circuit is started to be supplied with said electric power from said charger through said charging circuit, on the other hand, said battery-main circuit power supply switch is switched into OFF by said switch control signal, so that an electric power is stopped to be supplied from said battery to said main circuit.

3. A charging system as claimed in claim 1, said charger further comprising:
a lock mechanism for keeping said charger and said electronic apparatus in a connected condition with each other;
an operation section by which an user conducts an operation for releasing said connected condition of said charger and said electronic apparatus;
a power supply circuit for producing en electric power supplied to said electronic apparatus; wherein
when said user conducts said operation by said operation section in said connected condition of said charger and said electronic apparatus, said battery-main circuit power supply switch is switched into ON, so that an electric power is started to be supplied from said battery to said main circuit; and
releasing of said connected condition of said charger and said electronic apparatus by said lock mechanism can be conducted only by a condition that said operation section is being operated.

4. A charging system as claimed in claim 3, said switch control signal producing section further comprising:
an original control signal outputting section for outputting an original control signal which is a source of said switch control signal in a condition that said operation section of said charger is being operated;
an NOT circuit which receives said original control signal inputted from said original control signal outputting section to produce an NOT output; and
an AND circuit which receives said NOT output from said NOT circuit and an output from said power supply circuit to produce an AND output as said switch control signal.

5. A charging system as claimed in claim 4, said original control signal outputting section further comprising:
an NOT circuit input changing switch which changes conditions whether or not said output from said power supply circuit is inputted into said NOT circuit in a condition that said electronic apparatus is connected to said charger; wherein
said NOT circuit input changing switch is switched into ON in said condition that said operation section is being operated, so that said output from said power supply circuit is inputted into said NOT circuit.

6. A charging system as claimed in claim 3, wherein an input inputted into said NOT circuit of said switch control signal producing section is connected to a ground potential through resistance.

7. A charging system as claimed in claim 1, wherein, until a predetermined delay time has passed after said electronic apparatus was connected to said charger, a power supply from said battery to said main circuit is maintained in a condition that said battery-main circuit power supply switch is ON, when said predetermined delay time has passed after said electronic apparatus was connected to said charger, said power supply from said battery to said main circuit is stopped in a condition that said battery-main circuit power supply switch is OFF.

8. A charging system as claimed in claim 7, wherein a delay circuit is provided in a transfer route of said switch control signal, and thereby said battery-main circuit power supply switch is maintained in a condition of ON until said delay time has passed after said electronic apparatus was connected to said charger.

9. A charging system as claimed in claim 1, said charging system further comprising:
switch control means which make said battery-main circuit power supply switch be ON in a case that an amount of power supply to said main circuit is not enough during a charge of said battery.

10. An electronic apparatus which has a battery capable of being charged and in which said battery can be charged by said charger being connected to said electronic apparatus, said electronic apparatus comprising:
a main circuit which is capable of being operable by being supplied with an electric power from said battery;
a battery-main circuit power supply switch for conducting ON/OFF of an electric power supply from said battery to said main circuit; wherein
in a condition that said electronic apparatus is removed from said charger, said battery-main circuit power supply switch is switched into ON, so that an electric power is supplied from said battery to said main circuit;
in a condition that said electronic apparatus is connected to said charger, not only said battery is started to be charged by said charger but also said main circuit is started to be supplied with said electric power from said charger, on the other hand, said battery-main circuit power supply switch is switched into OFF, so that an electric power is stopped to be supplied from said battery to said main circuit.

11. An electronic apparatus which has a battery capable of being charged and in which said battery can be charged by said charger being connected to said electronic apparatus, said electronic apparatus comprising:
   a main circuit which is capable of being operable by being supplied with an electric power from said battery;
   a battery-main circuit power supply switch for conducting ON/OFF of an electric power supply from said battery to said main circuit;
   a charging circuit which divides an electric power supplied from said charger into an electric power supplied to said battery and an electric power supplied to said main circuit, so that the electric power is supplied to said battery and said main circuit, respectively; wherein
   in a condition that said electronic apparatus is removed from said charger, said battery-main circuit power supply switch is switched into ON, so that an electric power is supplied from said battery to said main circuit;
   in a condition that said electronic apparatus is connected to said charger, not only said battery is started to be charged by said charger through said charging circuit but also said main circuit is started to be supplied with said electric power from said charger through said charging circuit, on the other hand, said battery-main circuit power supply switch is switched into OFF, so that an electric power is stopped to be supplied from said battery to said main circuit.

12. An electronic apparatus as claimed in claim 10, said charger further comprising:
   a lock mechanism for keeping said charger and said electronic apparatus in a connected condition with each other;
   an operation section by which an user conducts an operation for releasing said connected condition of said charger and said electronic apparatus;
   a power supply circuit for producing en electric power supplied to said electronic apparatus; wherein
   when said user conducts said operation by said operation section in said connected condition of said charger and said electronic apparatus, said battery-main circuit power supply switch is switched into ON, so that an electric power is started to be supplied from said battery to said main circuit; and
   releasing of said connected condition of said charger and said electronic apparatus by said lock mechanism can be conducted only by a condition that said operation section is being operated.

13. An electronic apparatus as claimed in claim 10, wherein until a predetermined delay time has passed after said electronic apparatus was connected to said charger, a power supply from said battery to said main circuit is maintained in a condition that said battery-main circuit power supply switch is ON, when said predetermined delay time has passed after said electronic apparatus was connected to said charger, said power supply from said battery to said main circuit is stopped in a condition that said battery-main circuit power supply switch is OFF.

14. An electronic apparatus as claimed in claim 10, said electronic apparatus further comprising:
   switch control means which make said battery-main circuit power supply switch be ON in a case that an amount of power supply to said main circuit is not enough during a charge of said battery.

15. An electronic apparatus as claimed in claim 10, wherein the electronic apparatus is a portable-type communication terminal apparatus.

16. An electronic apparatus as claimed in claim 15, wherein the electronic apparatus is a portable telephone.

17. An electronic apparatus as claimed in claim 10, wherein the electronic apparatus is a portable-type information terminal apparatus.

18. A charger which, by being connected to an electronic apparatus having a battery capable of being charged, a main circuit capable of being operable by being supplied with an electric power from said battery, and a battery-main circuit power supply switch for conducting ON/OFF of an electric power supply from said battery to said main circuit, can charge said battery, wherein said charger comprising:
   a lock mechanism for keeping said charger and said electronic apparatus in a connected condition with each other;
   an operation section by which an user conducts an operation for releasing said connected condition of said charger and said electronic apparatus;
   a power supply circuit for producing en electric power supplied to said electronic apparatus; wherein
   in a condition that said electronic apparatus is removed from said charger, said battery-main circuit power supply switch is switched into ON, so that an electric power is supplied from said battery to said main circuit;
   in a condition that said electronic apparatus is connected to said charger, not only said battery is started to be charged by said charger but also said main circuit is started to be supplied with said electric power from said charger, on the other hand, said battery-main circuit power supply switch is switched into OFF, so that an electric power is stopped to be supplied from said battery to said main circuit;
   when said user conducts said operation by said operation section in said connected condition of said charger and said electronic apparatus, said battery-main circuit power supply switch is switched into ON, so that an electric power is started to be supplied from said battery to said main circuit; and
   releasing of said connected condition of said charger and said electronic apparatus by said lock mechanism can be conducted only by a condition that said operation section is being operated.

19. A charger which can charge a battery of an electronic apparatus by being connected to said electronic apparatus having said battery capable of being charged, a main circuit capable of being operable by being supplied with an electric power from said battery, a battery-main circuit power supply switch for conducting ON/OFF of an electric power supply from said battery to said main circuit, and a charging circuit which divides an electric power supplied from said charger into an electric power supplied to said battery and an electric power supplied to said main circuit, so that the electric power is supplied to said battery and said main circuit, respectively, wherein said charger comprising:
   a lock mechanism for keeping said charger and said electronic apparatus in a connected condition with each other;
   an operation section by which an user conducts an operation for releasing said connected condition of said charger and said electronic apparatus;
   a power supply circuit for producing en electric power supplied to said electronic apparatus; wherein
   in a condition that said electronic apparatus is removed from said charger, said battery-main circuit power supply switch is switched into ON, so that an electric power is supplied from said battery to said main circuit;
   in a condition that said electronic apparatus is connected to said charger, not only said battery is started to be charged by said charger but also said main circuit is started to be supplied with said electric power from said charger, on the other hand, said battery-main circuit power supply switch is switched into OFF, so that an electric power is stopped to be supplied from said battery to said main circuit;

when said user conducts said operation by said operation section in said connected condition of said charger and said electronic apparatus, said battery-main circuit power supply switch is switched into ON, so that an electric power is started to be supplied from said battery to said main circuit; and releasing of said connected condition of said charger and said electronic apparatus by said lock mechanism can be conducted only by a condition that said operation section is being operated.

20. A charging method which is a method of charging a battery of an electronic apparatus in a charging system comprising said electronic apparatus having said battery capable of being charged, a main circuit capable of being operable by being supplied with an electric power from said battery, a battery-main circuit power supply switch for conducting ON/OFF of an electric power supply from said battery to said main circuit; and a charger which charges said battery in a condition that said electronic apparatus is connected to the charger, wherein said charger comprising:

a lock mechanism for keeping said charger and said electronic apparatus in a connected condition with each other;

an operation section by which an user conducts an operation for releasing said connected condition of said charger and said electronic apparatus;

a power supply circuit for producing en electric power supplied to said electronic apparatus; wherein said charging method comprising:

a first step of switching said battery-main circuit power supply switch into ON, in a condition that said electronic apparatus is removed from said charger, so that an electric power is supplied from said battery to said main circuit;

a second step of not only making said battery be started to be charged by said charger but also making said main circuit be started to be supplied with said electric power from said charger, on the other hand, switching said battery-main circuit power supply switch into OFF, in a condition that said electronic apparatus is connected to said charger, so that an electric power is stopped to be supplied from said battery to said main circuit;

a third step of switching said battery-main circuit power supply switch into ON, when said user conducts said operation by said operation section in said connected condition of said charger and said electronic apparatus, so that an electric power is started to be supplied from said battery to said main circuit; and a fourth step of rendering release of said connected condition of said charger and said electronic apparatus by said lock mechanism to be conducted only by a condition that said operation section is being operated.

21. A charging method which is a method of charging a battery of an electronic apparatus in a charging system comprising said electronic apparatus having said battery capable of being charged, a main circuit capable of being operable by being supplied with an electric power from said battery, a battery-main circuit power supply switch for conducting ON/OFF of an electric power supply from said battery to said main circuit, and a charging circuit which divides an electric power supplied from said charger into an electric power supplied to said battery and an electric power supplied to said main circuit, so that the electric power is supplied to said battery and said main circuit, respectively; and a charger which charges said battery in a condition that said electronic apparatus is connected to the charger, wherein said charger comprising:

a lock mechanism for keeping said charger and said electronic apparatus in a connected condition with each other;

an operation section by which an user conducts an operation for releasing said connected condition of said charger and said electronic apparatus;

a power supply circuit for producing en electric power supplied to said electronic apparatus; wherein said charging method comprising:

a first step of switching said battery-main circuit power supply switch into ON, in a condition that said electronic apparatus is removed from said charger, so that an electric power is supplied from said battery to said main circuit;

a second step of not only making said battery be started to be charged by said charger through said charging circuit but also making said main circuit be started to be supplied with said electric power from said charger through said charging circuit, on the other hand, switching said battery-main circuit power supply switch into OFF, in a condition that said electronic apparatus is connected to said charger, so that an electric power is stopped to be supplied from said battery to said main circuit;

a third step of switching said battery-main circuit power supply switch into ON, when said user conducts said operation by said operation section in said connected condition of said charger and said electronic apparatus, so that an electric power is started to be supplied from said battery to said main circuit; and a fourth step of rendering release of said connected condition of said charger and said electronic apparatus by said lock mechanism to be conducted only by a condition that said operation section is being operated.

22. A charging method which is a method of charging a battery of an electronic apparatus in a charging system comprising said electronic apparatus having said battery capable of being charged, a main circuit capable of being operable by being supplied with an electric power from said battery, a battery-main circuit power supply switch for conducting ON/OFF of an electric power supply from said battery to said main circuit; and a charger which charges said battery in a condition that said electronic apparatus is connected to the charger; wherein said charging method comprising:

a first step of switching said battery-main circuit power supply switch into ON, in a condition that said electronic apparatus is removed from said charger, so that an electric power is supplied from said battery to said main circuit;

a second step of not only making said battery be started to be charged by said charger but also making said main circuit be started to be supplied with said electric power from said charger;

a third step of maintaining said battery-main circuit power supply switch in a condition of ON, until a predetermined delay time has passed after said electronic apparatus was connected to said charger, and thereby maintaining a power supply from said battery to said main circuit; and a fourth step of switching said battery-main circuit power supply switch into OFF, when said predetermined delay time has passed after said electronic apparatus was connected to said charger, and thereby stopping said power supply from said battery to said main circuit.

23. A charging method which is a method of charging a battery of an electronic apparatus in a charging system comprising said electronic apparatus having said battery capable of being charged, a main circuit capable of being operable by being supplied with an electric power from said battery, a battery-main circuit power supply switch for conducting ON/OFF of an electric power supply from said battery to said main circuit, and a charging circuit which divides an electric power supplied from said charger into an electric power supplied to said battery and an electric power supplied to said main circuit, so that the electric power is supplied to said battery and said main circuit, respectively; and a charger which charges said battery in a condition that said electronic apparatus is connected to the charger; wherein said charging method comprising:
- a first step of switching said battery-main circuit power supply switch into ON, in a condition that said electronic apparatus is removed from said charger, so that an electric power is supplied from said battery to said main circuit;
- a second step of not only making said battery be started to be charged by said charger through said charging circuit but also making said main circuit be started to be supplied with said electric power from said charger through said charging circuit;
- a third step of maintaining said battery-main circuit power supply switch in a condition of ON, until a predetermined delay time has passed after said electronic apparatus was connected to said charger, and thereby maintaining a power supply from said battery to said main circuit; and
- a fourth step of switching said battery-main circuit power supply switch into OFF, when said predetermined delay time has passed after said electronic apparatus was connected to said charger, and thereby stopping said power supply from said battery to said main circuit.

24. A charging method as claimed in claim 20, said charging method further comprising:
- a step of judging whether or not an amount of power supply to said main circuit is enough during a charge of said battery; and
- a step of switching said battery-main circuit power supply switch into ON in a case that an amount of power supply to said main circuit is judged to be not enough during a charge of said battery.

* * * * *